(12) United States Patent
Shimoguchi

(10) Patent No.: US 7,505,378 B2
(45) Date of Patent: Mar. 17, 2009

(54) DISK REPRODUCING APPARATUS AND DISK REPRODUCING METHOD

(75) Inventor: Tadashi Shimoguchi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1013 days.

(21) Appl. No.: 10/927,594

(22) Filed: Aug. 27, 2004

(65) Prior Publication Data

US 2005/0047755 A1 Mar. 3, 2005

(30) Foreign Application Priority Data

Aug. 28, 2003 (JP) .................... P. 2003-209178

(51) Int. Cl.
*G11B 7/085* (2006.01)
(52) U.S. Cl. .................................. 369/30.8
(58) Field of Classification Search ............ 369/30.8, 369/32, 47.15; 386/96
See application file for complete search history.

(56) References Cited

U.S. PATENT DOCUMENTS 6,275,451 B1 * 8/2001 Park et al. ............... 386/106
6,308,006 B1 * 10/2001 Yamamoto et al. ........... 386/96
6,392,969 B1 * 5/2002 Heo ...................... 369/47.15

FOREIGN PATENT DOCUMENTS

JP 11-164258 6/1999

* cited by examiner

*Primary Examiner*—Marvin M Lateef
*Assistant Examiner*—Brenda Bernardi
(74) *Attorney, Agent, or Firm*—Morgan, Lewis & Bockius LLP

(57) ABSTRACT

A disk reproducing apparatus capable of reproducing data that is recorded on a DVD-Audio, includes a data reproducing unit which reproduces the data, a displaying unit, and a controlling unit which controls the data reproducing unit and the displaying unit. Preferably, the controlling unit, in reproducing a group of data, causes the data reproducing unit to reproduce in seriatim respective data in subgroups, after data in each subgroup is reproduced, decides whether the subgroup is a last subgroup in the group, if the subgroup is the last subgroup, decides whether a menu display forced is indicated, if the menu display forced is indicated, forms and displays a menu screen based on menu data in management data, if the menu display forced is not indicated, decides whether the menu data is present, and if the menu data is present, forms and displays the menu screen based on the menu data.

10 Claims, 6 Drawing Sheets

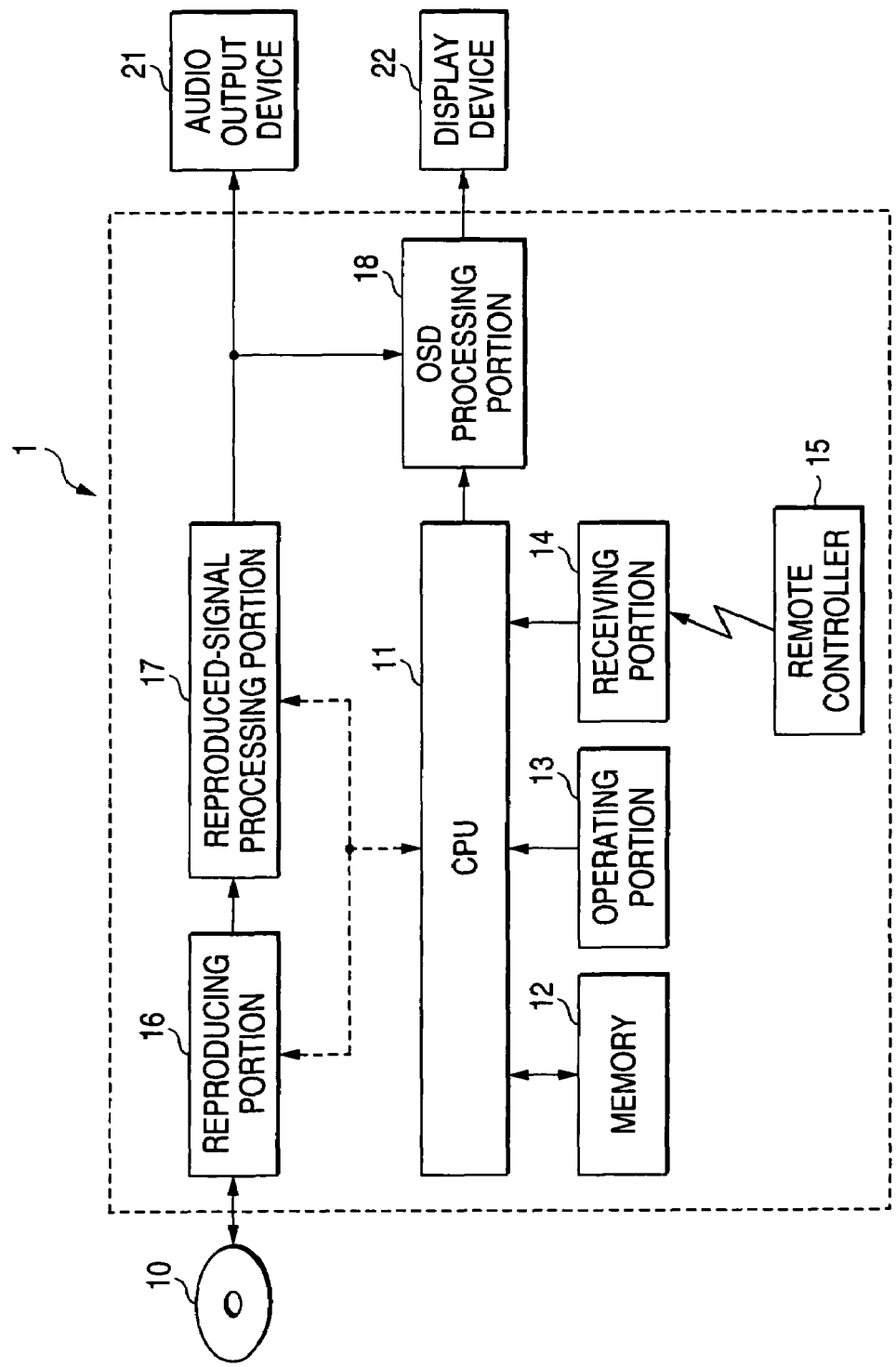

DISK REPRODUCING APPARATUS AND DISK REPRODUCING METHOD

BACKGROUND OF THE INVENTION

1. Field of the Invention

The present invention relates to a disk reproducing apparatus capable of reproducing data recorded on a DVD-Audio.

2. Description of the Related Art

The music is recorded on the CD in the prior art, but recently the music is also recorded on the DVD having the high recording density. Also, the DVD-Audio that is able to reproduce the music of the sound quality higher than the DVD (referred to as the "DVD-Audio" hereinafter) comes on the market. In compliance with the DVD-Audio standard, if particular data set in the management area in the DVD-Audio has a predetermined value when the reproduction of a group consisting of a series of plural musical pieces is ended, the menu display of the DVD-Audio should be carried out subsequently. In contrast, unless the particular data has the predetermined value, it is set voluntarily whether or not the menu display should be carried out. In this event, in the conventional disk reproducing apparatus, the reproduction is stopped not to display the menus unless the particular data has the predetermined value when the reproduction of the group consisting of a series of plural musical pieces is ended. In addition, it is set forth in JP-A-11-164258 (Abstract, Paragraph 0075, Paragraph 0081, FIGS. 1 to 3) that the process is jumped into the music selection menu at a point of time when the reproduction of one musical piece in the DVD such as Karaoke, or the like in which a large number of musical pieces are recorded is ended.

SUMMARY OF THE INVENTION

However, in the conventional disk reproducing apparatus, sometimes the music is stopped suddenly with no display after the reproduction of the group consisting of a series of plural musical pieces is ended. For this reason, sometimes such situation causes the viewer to feel a sense of unease, e.g., such a feeling of uneasiness that the viewer made any false operation. Also, since the menu display is not executed after the reproduction is ended, there existed the problem that the conventional disk reproducing apparatus is inconvenient for use. Meanwhile, in the disk reproducing apparatus disclosed in JP-A-11-164258, since the process is jumped into the music selection menu at a point of time when the reproduction of one musical piece is ended, there existed the problem that the viewer cannot enjoy leisurely a series of plural musical pieces.

The present invention has been made to overcome the above problems, and it is the subject of the present invention to provide a disk reproducing apparatus capable of displaying menus as many times as possible after a reproduction of a group of a DVD-Audio is ended.

In the present invention, a disk reproducing apparatus capable of reproducing data that is recorded on a DVD-Audio includes a data reproducing unit which reproduces the data, a displaying unit, and a controlling unit which controls the data reproducing unit and the displaying unit. Preferably, in reproducing a group of data the controlling unit causes the data reproducing unit to reproduce in seriatim respective data in one or a plurality of subgroups belonging to the group, after data in each subgroup belonging to the group is reproduced the controlling unit decides whether or not the subgroup is a last subgroup in the group, if the subgroup is the last subgroup in the group the controlling unit decides whether or not a menu display forced is indicated from management data of the subgroup, if the menu display forced is indicated the controlling unit forms a menu screen based on menu data in management data of the DVD-Audio and causes the displaying unit to display the menu screen, if the menu display forced is not indicated the controlling unit decides whether or not the menu data is present from the management data of the DVD-Audio, and if the menu data is present the controlling unit forms the menu screen based on the menu data and causes the displaying unit to display the menu screen.

When constructed in this manner, the menu screen is displayed after the reproduction of the group is ended in as much as the menu screen can be displayed. Therefore, the case where the situation causes the viewer to feel a sense of unease can be reduced and also the operability can be improved. Also, since the menu screen is displayed only in the case where the reproduction of the data in the last subgroup belonging to the group is ended, the reproduction of the group is in no way interrupted in the middle.

Also, in the present invention, a disk reproducing apparatus capable of reproducing data that is recorded on a DVD-Audio, includes a data reproducing unit which reproduces the data, a displaying unit, and a controlling unit which controls the data reproducing unit and the displaying unit. Preferably, in reproducing a group of data the controlling unit causes the data reproducing unit to reproduce in seriatim respective data in one or a plurality of subgroups belonging to the group, after data in each subgroup belonging to the group is reproduced the controlling unit makes a first decision to decide whether or not the subgroup is a last subgroup in the group, if the subgroup is the last subgroup in the group the controlling unit makes a second decision to decide whether or not a menu display forced is indicated from management data of the subgroup, and even if the menu display forced is not indicated the controlling unit forms a menu screen and causes the displaying unit to display the menu screen.

When constructed in this manner, the menu screen is displayed after the reproduction of the group is ended even though it is not forced to display the menu screen. Therefore, the case where the situation causes the viewer to feel any sense of unease can be eliminated and also the operability can be improved. Also, since the menu screen is displayed only in the case where the reproduction of the data in the last subgroup belonging to the group is ended, the reproduction of the group is never paused in the middle.

Also, in the present invention, when the group consists of a plurality of groups, the first decision is made in response to whether or not the subgroup is the last subgroup in the last group of the plurality of subgroups. When constructed in this manner, upon reproducing a plurality of groups, the menu screen is displayed after the reproduction of the last group is ended. Therefore, the reproduction of a plurality of groups is in no way interrupted in the middle.

Also, in the present invention, when a repeat play is executed in reproducing the group, the controlling unit neither makes the second decision nor displays the menu screen. Therefore, the viewer can enjoy repeatedly the reproduction without a trouble caused in the middle.

Also, in the present invention, a disk reproducing method for reproducing data that is recorded on a DVD-Audio, includes in reproducing a group of data reproducing in seriatim respective data in one or a plurality of subgroups belonging to the group, after data in each subgroup belonging to the group is reproduced deciding whether or not the subgroup is a last subgroup in the group, if the subgroup is the last subgroup in the group deciding whether or not a menu display forced is indicated from management data of the subgroup, if the menu display forced is indicated forming a menu screen based on menu data in management data of the DVD-Audio and displaying the menu screen, if the menu display forced is not indicated deciding whether or not the menu data is present from the management data of the DVD-Audio, and if the menu data is present forming the menu screen based on the menu data, and displaying the menu screen.

BRIEF DESCRIPTION OF THE DRAWINGS

Preferred embodiments of the present invention will be described in detail based on the following figures, wherein:

FIG. 1 is a block diagram of a disk reproducing apparatus according to the present invention;

DETAILED DESCRIPTION OF THE INVENTION

Figures 2A, 2B, 2C:
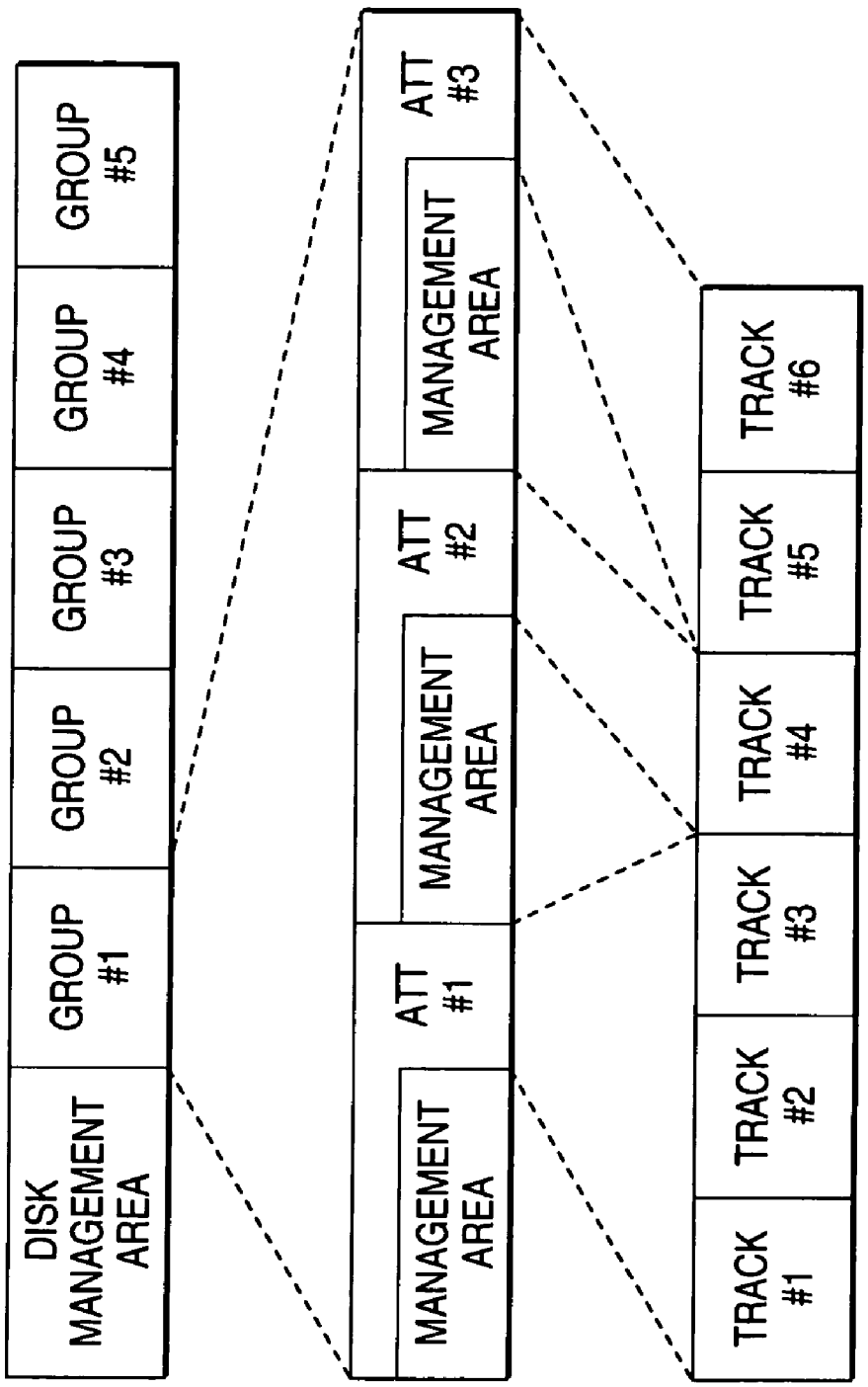
FIGS. 2A to 2C are views showing hierarchically a data structure of a DVD-Audio.

FIG. 1 is a block diagram of a disk reproducing apparatus 1 according to the present invention. This disk reproducing apparatus 1 reproduces data in a disk 10 as one of various recording media such as DVD, CD, VCD (Video CD), DVD-Audio, and so forth, on which video and/or audio data are recorded.

A reproducing portion 16 is composed of a tray for loading the disk 10 thereon to insert and remove, a reproducing head for reproducing the data on the disk 10, a turning/driving mechanism for turning the disk 10 in reproducing, a moving mechanism for moving the reproducing head in the radial direction of the disk 10, and others. Also, a sensor is provided to the reproducing portion 16 such that a CPU 11 can check whether or not the disk 10 is loaded, the tray is in its opened state, and the like. The data of the disk 10 reproduced by the reproducing portion 16 are decoded every audio data and every video data by a reproduced-signal processing portion 17, and then are subjected to the D/A conversion. The D/A-converted audio signal is sent to an audio output device 21 (e.g., an audio output portion of the audio set, the television receiver, or the like). The D/A-converted video signal is sent to a display device 22 (e.g., a display portion of the monitor, the television receiver, or the like) as a displaying unit via an OSD processing portion 18.

This disk reproducing apparatus 1 has an on-screen display (abbreviated as "OSD" hereinafter) function of displaying various messages on the display device 22 to inform the viewer of the presence of the disk 10, the opened state of the tray, and so on. OSD data read from a memory 12 are processed partially by the CPU 11, as the case may be, then sent to the OSD processing portion 18 via the CPU 11, and then superposed on the reproduced data of the disk 10 there and sent to the display device 22.

The memory 12, an operating portion 13, and a receiving portion 14 are connected to the CPU 11. A program used to control the operation of the disk reproducing apparatus 1, the above OSD data, various control data, and the like are stored in the memory 12. The memory 12 is also used as an operating/working area of the CPU 11. Also, the operating portion 13 provided on a front panel (not shown) of the disk reproducing apparatus 1 is equipped with "PLAY" key, "PAUSE" key, etc. used to execute basic operations such as the start of play, the pause of play, etc. of the disk 10. Except the keys used to execute the basic operations, a number of keys (for example, "CURSOR" key, "DECIDE" key, "RETURN" key, "MENU" key, etc.) are provided to a remote controller 15. Signals of respective keys in the remote controller 15 sent to the receiving portion 14 as light signals. When any key on the operating portion 13 or the remote controller 15 is pressed, the process responding to the type of the key is executed by the CPU 11.

FIGS. 2A to 2C are views showing hierarchically a data structure of the DVD-Audio. FIG. 2A shows the uppermost hierarchy, and this uppermost hierarchy consists of one disk management area and at least one group. Respective groups are specified by the number, and the number of the first group is 1 and then the number of the group is increased one by one. In FIG. 2A, five groups (group #1 to group #5) are shown. The group mentioned herein signifies the group consisting of a plurality of musical pieces, and corresponds to a group of musical pieces that are divided by rules such as singer, age, etc. respectively, for example.

FIG. 2B shows the second hierarchy, wherein three ATTs (ATT#1 to ATT#3, ATT, which is an abbreviation of Audio Title, is also called "subgroup") belonging to the group #1 are shown. The management area is placed at the head of each ATT. Each ATT is specified by the number, and the number of the first ATT of the DVD-Audio is 1 and then the number of the ATT is increased in seriatim one by one. Thus, the number of the first ATT belonging to the group #2 is given as 4. Also, each group contains at least one ATT.

FIG. 2C shows the third hierarchy, wherein six tracks (track #1 to track #6) belonging to ATT#1 to ATT#3 are shown. Each track is specified by the number, and the number of the first track of the DVD-Audio is 1 and then the number of the track is increased in seriatim one by one. Thus, the number of the first track belonging to the ATT #4 is given as 7. Also, each ATT contains at least one track. In this case, the group and the track are the unit that the viewer can access, and thus the VDV-Audio can be reproduced in the pointed area by pointing the number of the group or the number of the track. In contrast, the ATT is the management unit used to manage one or plural tracks, and is used as a subgroup unit.

Figure 3A:
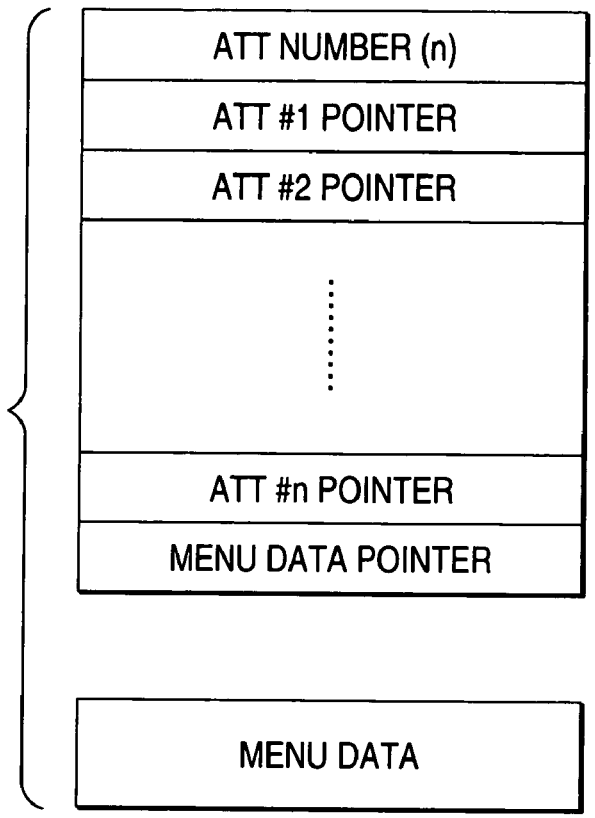
FIGS. 3A and 3B are views showing management data that are stored in a management area.
Figure 3B:
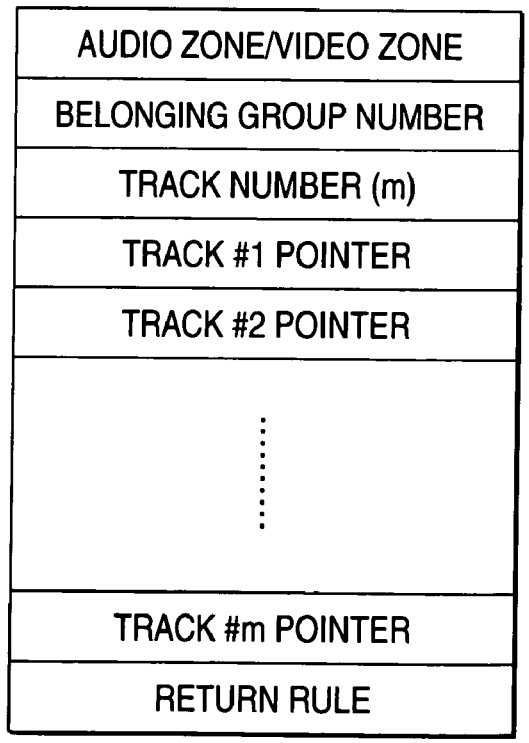

FIGS. 3A and 3B are views showing management data that are stored in the management area. FIG. 3A shows management data that are stored in the disk management area. An "ATT number" is the number of all ATTs contained in the disk 10, and here the number of ATTs is set to n. An "ATT #1 pointer" to an "ATT #n pointer" (referred to as the "ATT pointer" hereinafter) are the pointer that points the head address of n ATTs on the disk 10 respectively. A "menu data pointer" is the pointer for pointing the head address on the disk 10 in which "menu data" is stored. In this case, when the "menu data" is not present, 0 is set to the "menu data pointer". The "menu data" is the data used to form a menu screen described later, and contents/modes of the menu screen are decided based on the contents of the "menu data". In this case, since the "menu data" has a large data size and is a variable-length data, the data is shown separately from other data.

FIG. 3B is a view showing the management data stored in the management area in each ATT. An "audio zone/video zone" indicates the type of the data in the track belonging to the ATT. When the content is given as the "audio zone", this indicates that the data in the track belonging to the ATT corresponds to the audio data formed in compliance with the DVD-Audio standard. When the content is given as the "video zone", this indicates that the data in the track belonging to the ATT corresponds to the data (for example, data of the logogram image of the DVD-Audio manufacturing company, various moving picture, still picture, etc.) except the audio data formed in compliance with the DVD-Audio standard. A "belonging group number" indicates the number of the group to which the ATT belongs. For example, 1 indicating the group #1 is set in the "belonging group number" of the ATT #3 shown in FIGS. 2A to 2C. A "track number" indicates the number of tracks belonging to the ATT. Here the number of tracks is set to m. A "track #1 pointer" to a "track #m pointer" (referred to as the "track pointer" hereinafter) are the pointer that points the head address of m tracks on the disk 10 respectively. For example, the "track number" of the ATT #3 shown in FIGS. 2A to 2C is 2, and the track #1 pointer and the track #2 pointer are set to point the head address of the track #5 and the track #6 respectively.

A "return rule" specifies whether or not the menu display should be executed after the reproduction of the data in all tracks belonging to each ATT is ended. The content corresponds to either a "menu display forced" or a "menu display allowed". When no "menu data" is present, the "menu display forced" is by no means set. Also, only the "menu display allowed" is set to the ATT other than the last ATT of the group. Then, in the case of the "menu display forced", the menu screen should always be displayed after the reproduction of the data in the last track of the ATT is ended. Also, in the case of the "menu display allowed", it is set voluntarily whether or not the menu screen should be displayed.

Figure 4A:
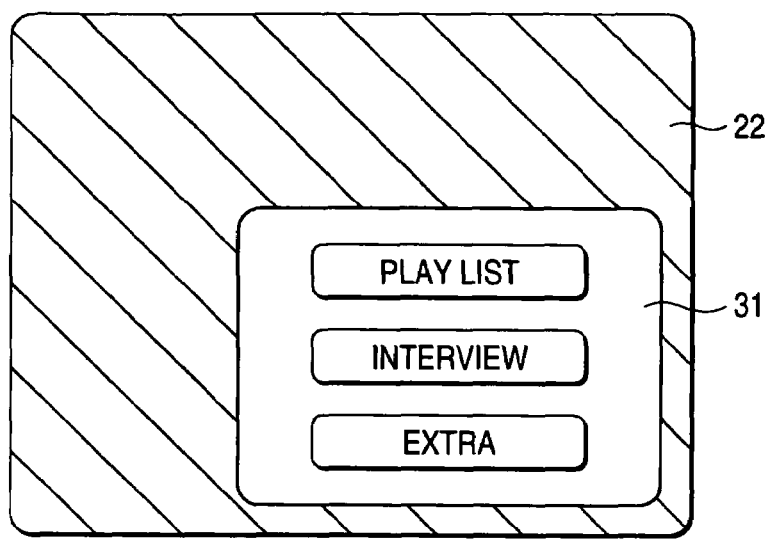
FIGS. 4A to 4C are views showing an example of a menu screen used to reproduce the DVD-Audio.
Figure 4B:
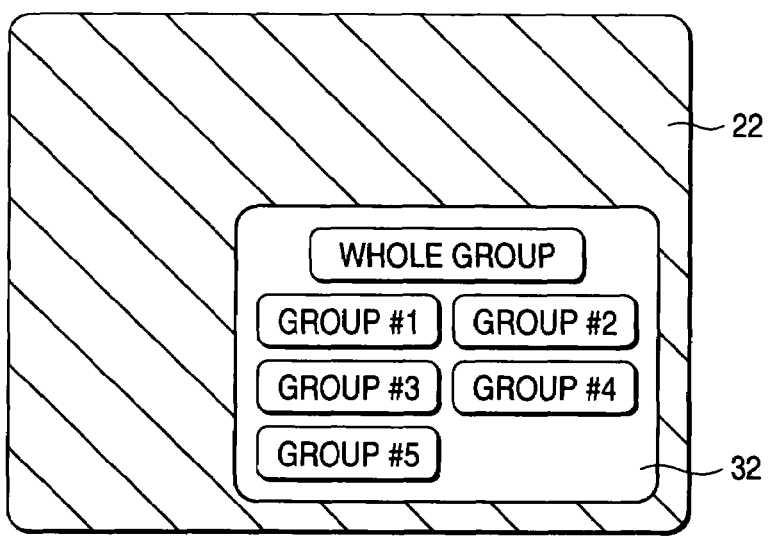
Figure 4C:
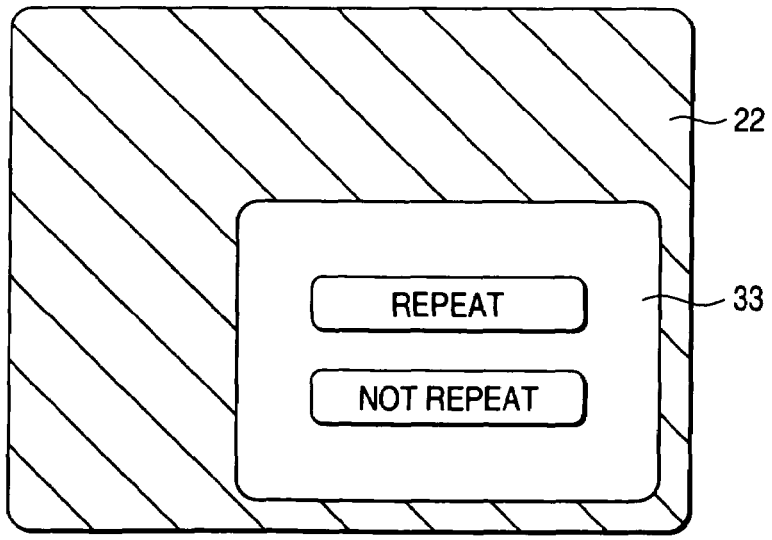

FIGS. 4A to 4C are views showing an example of the menu screen used to reproduce the DVD-Audio. When a "MENU" key on the remote controller 15 is pressed in a state that the DVD-Audio is set in the tray of the reproducing portion 16, a first menu screen 31 shown in FIG. 4A is displayed on the display device. A hatched portion in FIGS. 4A to 4C is the background image. The content/mode of the first menu screen 31 depends on the contents of the "menu data" (see FIG. 3A). In other words, the contents of the "menu data" are read (reproduced) from the disk management area, and then such contents are processed by the CPU 11 and displayed on the display device 22. In this case, when 0 is set in the "menu data pointer", the "menu data" is not present. Thus, the CPU 11 displays the similar menu screen as OSD.

When the "DECIDE" key on the remote controller 15 is pressed in a state that a "play list" on the first menu screen 31 is chosen by operating the "CURSOR" key on the remote controller 15, a second menu screen 32 shown in FIG. 4B is displayed. In this case, when the "RETURN" key on the remote controller 15 is pressed in the first menu screen 31, this first menu screen 31 disappears.

When the "CURSOR" key on the remote controller 15 is operated on the second menu screen 32, either "whole group" or "group #1" to "group #5" is chosen. Here the "whole group" means that the data in the whole group are to be reproduced. The "group #1" to "group #5" means that only the data in the chosen (pointed) group are to be reproduced. When the "DECIDE" key on the remote controller 15 is pressed in a state that any one of them is chosen, a third menu screen 33 shown in FIG. 4C is displayed. In this case, when the "RETURN" key on the remote controller 15 is pressed on the second menu screen 32, the display screen goes back to the first menu screen 31.

When the "CURSOR" key on the remote controller 15 is operated on the third menu screen 33, either "Repeat" or "Not Repeat" is chosen. The "Repeat" means that the data as the reproduced object is reproduced repeatedly after the reproduction of the data as the reproduced object chosen on the second menu screen 32 is ended. When the "DECIDE" key on the remote controller 15 is pressed in a state that any one of them is chosen, the execution of the reproducing program of the DVD-Audio according to the present invention is started. The execution of the program will be described later. In this case, when the "RETURN" key on the remote controller 15 is pressed on the third menu screen 33, the display screen goes back to the second menu screen 32.

Figure 5:
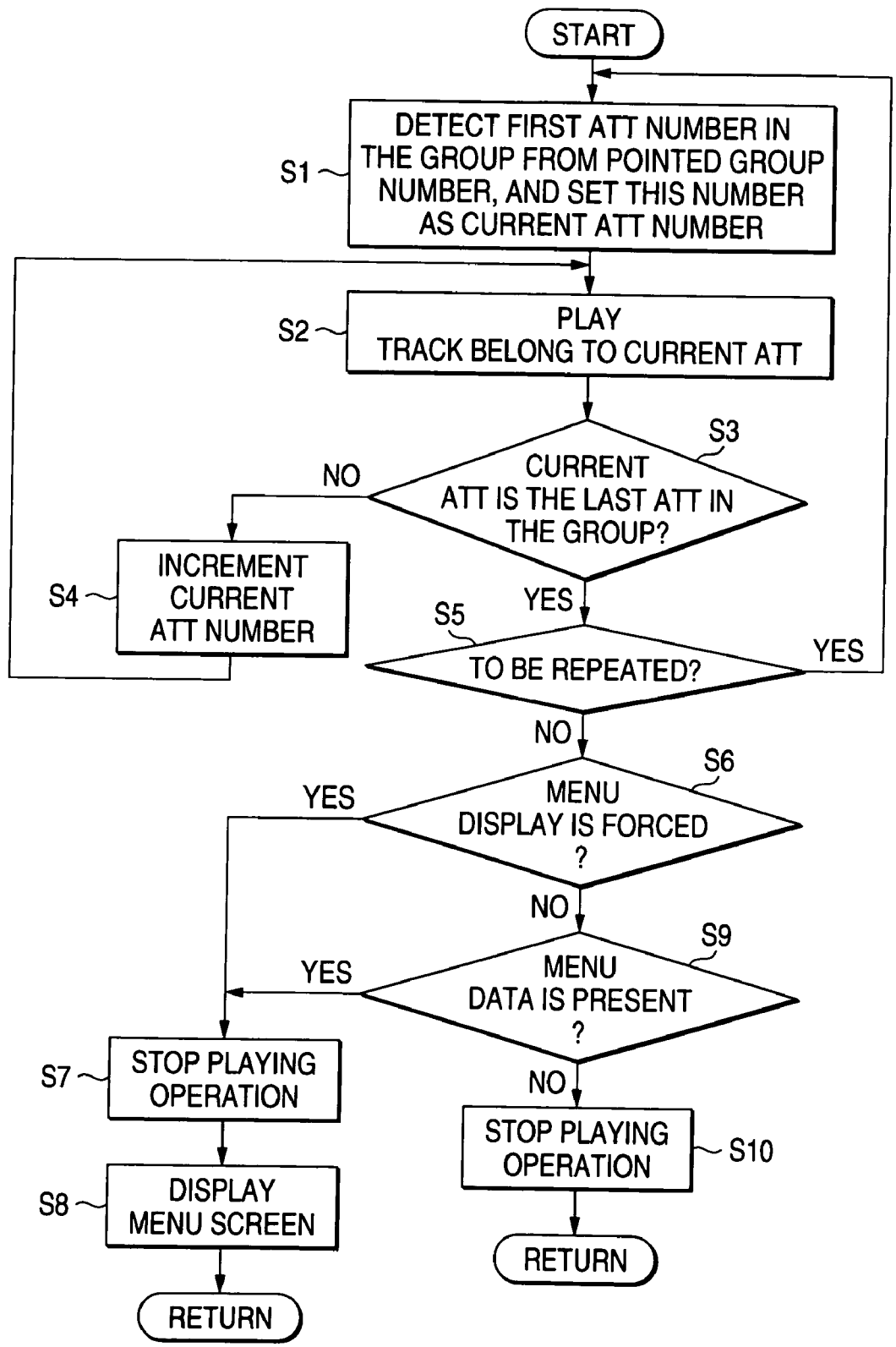
FIG. 5 is a flowchart showing operations taken when the pointed group is to be reproduced.

FIG. 5 is a flowchart showing operations taken when the pointed group is to be reproduced. This program is started when any one of the "group #1" to the "group #5" shown in FIG. 4B is chosen, and then the number of the pointed group and the data indicating whether or not the Repeat is executed are transferred as arguments from the access source. First, the number of the first ATT number belonging to the group is detected from the number in the pointed group, and then this number is set as the number of the current ATT (S1). The number of the current ATT is stored in the memory 12. This operation is executed as follows. The value set in the "belong group number" (see FIG. 3B), which is stored in the management area of the ATT pointed by each pointer, is obtained sequentially from the ATT #1 pointer (see FIG. 3A). This value is compared with the number of the pointed group, and then the number of ATT obtained when they coincide with each other for the first time is set as the number of the first ATT belonging to the pointed group.

Then, the data on the track belong to the current ATT is reproduced (S2). The "number of track" and the "track pointer" (see FIG. 3B) are used to reproduce the data on the track belong to the current ATT. Thus, the head addresses of respective tracks from the first track to the last track belong to the current ATT are derived, and the data are sequentially reproduced based on the addresses. At this time, the number of the group and the number of the track, which are being reproduced, may be displayed on the display device 22 as OSD.

Then, it is decided whether or not the current ATT is the last ATT in the pointed group (S3). This decision will be made as follows. If the number of the current ATT is equal to the number of the "ATT number" (see FIG. 3A), it is decided that the current ATT is the last ATT in the pointed group. If not and then if the value of the "belonging group number" of the ATT subsequent to the current ATT is different from the number of the pointed group, it is decided that the current ATT is the last ATT in the pointed group. If the situation does not come under above cases, it is decided that the current ATT is not the last ATT in the pointed group.

In S3, if it is decided that the current ATT is not the last ATT in the pointed group, the number of the current ATT is incremented (S4), and then the process goes back to S2. Thus, the reproduction of the track belonging to the next ATT in the pointed group is executed. In S3, if it is decided that the current ATT is the last ATT in the pointed group, the reproduction of the pointed group is completed. Thus, it is decided by checking the argument transferred from the access source whether or not repetition (Repeat Play) should be executed (S5). If the repetition should be executed, the process goes back to S1. Thus, the reproduction from the track belonging to the first ATT in the pointed group is repeated.

If the repetition should not be executed, it is decided whether or not the content of the "return rule" (see FIG. 3B) of the current ATT (which is also the last ATT in the group) corresponds to "menu display forced" (S6). If the content corresponds to the "menu display forced", a reproducing operation is stopped (S7), then the menu screen (more particularly, the first menu screen 31 formed based on the "menu data") is displayed (S8), and then the process goes back to the access source. If the content does not correspond to the "menu display forced" (i.e., "menu display allowed"), it is decided whether or not the "menu data" (see FIG. 3A) is present, by checking whether or not the content of the "menu data pointer" (see FIG. 3A) is 0 (S9). If the "menu data" is present, the process goes to S7. If the "menu data" is not present, the reproducing operation is stopped (S10), and then the process goes back to the access source. In this case, illustration of the operation taken when the "pause" key, or the like is pressed during the reproducing operation is omitted in FIG. 5. But it is needless to say that the reproducing operation is stopped temporarily when the "pause" key is pressed, for example. This aspect is similarly true of next FIG. 6.

In the above case, even though the content of the "return rule" corresponds to the "menu display allowed", the menu display is executed if it is decided whether or not the "menu data" is present and then it is decided that the "menu data" is present. Therefore, the case where the situation causes the viewer to feel a sense of unease can be reduced and also the operability can be improved. Also, since it is decided not in all ATTs but only in the last ATT in the pointed group whether or not the "menu data" is present, the reproduction of the pointed group is in no way interrupted in the middle. In addition, since the process is set not to go to the menu display when the repetition is chosen, the reproduction of the data in the group is executed repeatedly.

Figure 6:
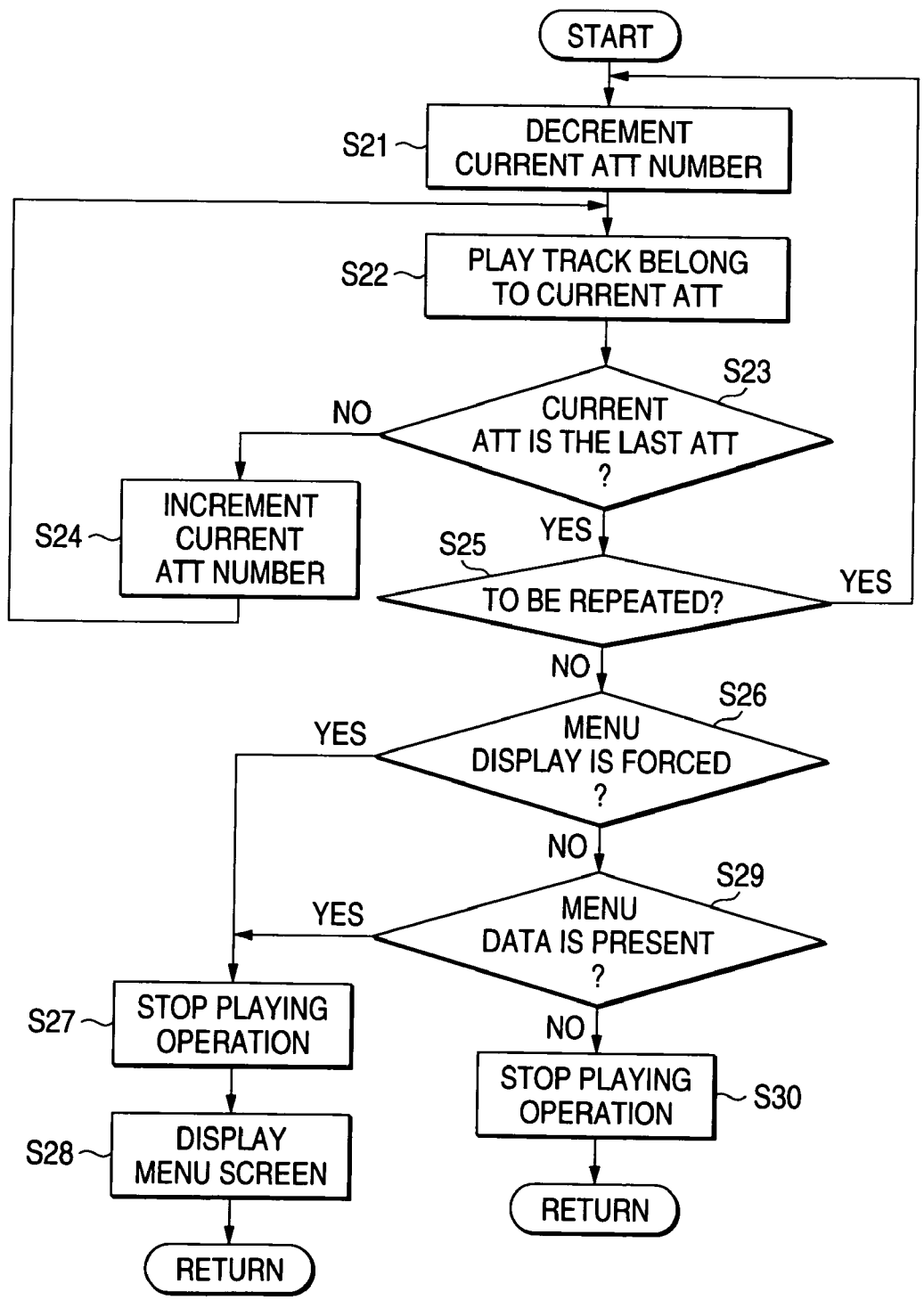
FIG. 6 is a flowchart showing operations taken when overall groups are reproduced.

FIG. 6 is a flowchart showing operations taken when the reproduction of the data in the whole group is executed. This program is started when the "whole group" shown in FIG. 4B is chosen, and then the data indicating whether or not the repetition should be executed is transferred from the access source as the argument. First, an area in which the current ATT is stored is assigned in the memory 12, and then 1 is set thereto. That is, the number of the current ATT is set to 1 (S21). Then, the data on the track belong to the current ATT is reproduced (S22).

Then, it is decided by comparing the content of the "ATT number" (see FIG. 3A) with the number of the current ATT whether or not the current ATT is the last ATT (S23). If it is decided that the current ATT is not the last ATT, the number of the current ATT is incremented (S24), and then the process goes back to S22. Thus, the reproduction of the ATT having the next number is carried out. If it is decided that the current ATT is the last ATT, it is decided by checking the argument transferred from the access source whether or not the repetition (Repeat Play) should be executed (S25). If the repetition should be executed, the process goes back to S21. Thus, the reproduction from the ATT having the number 1 is repeated. If the repetition should not be executed, S26 to S30 are executed and then the process goes back to the access source. Since S26 to S30 are identical to S6 to S10 in FIG. 5, their explanation will be omitted herein.

In the above case, since it is decided not in all ATTs but only in the last ATT (in other words, the last ATT in the last group of a plurality of groups) in the disk 10 whether or not the "menu data" is present, the reproduction of all the groups is never broken off in the middle. In addition, since the process is set not to go to the menu display when the repetition is chosen, the reproduction of the data in all the groups is executed repeatedly.

In the embodiment, the case where the disk reproducing apparatus 1 is the read only reproducing apparatus is explained as above. The present invention can also be applied to the disk reproducing apparatus that can executed the record and the reproduction of the disk, the disk reproducing apparatus built-in television receiver, and others. Also, in the embodiment, the DVD-Audio is explained as above. The present invention can also be applied to the recording medium having the similar data structure to the DVD-Audio.

In addition, in the embodiment, the case where the first menu screen 31 formed based on the "menu data", which are recorded in the disk management area as the menu display after the reproduction of the group is ended, is displayed is explained as above. Another menu screen, e.g., a screen corresponding to the second menu screen 32, may be displayed.

According to the present invention, the menu display is executed as many as possible after the reproduction of the group in the DVD-Audio is completed. As a result, the case where the situation causes the viewer to feel a sense of unease can be reduced and also the operability can be improved.

What is claimed is:

1. A disk reproducing apparatus capable of reproducing data that is recorded on a DVD-Audio, comprising:
    a data reproducing unit configured to reproduce the data;
    a displaying unit; and
    a controlling unit being:
        configured to control the data reproducing unit to reproduce in seriatim respective data in one or a plurality of subgroups belonging to the group when a group of data is reproduced;
        configured to determine whether or not the subgroup is a last subgroup in the group, after data in each subgroup belonging to the group is reproduced;
        configured to determine whether or not a menu display forced is indicated from management data of the subgroup when the subgroup is the last subgroup in the group;
        configured to form a menu screen based on menu data in management data of the DVD-Audio and control the display unit to display the menu screen when the menu display forced is indicated;
        configured to determine whether or not the menu data is present from the management data of the DVD-Audio, when the menu display forced is not indicated, and
        configured to form the menu screen based on the menu data and control the display unit to display the menu screen when the menu data is present.

2. A disk reproducing apparatus capable of reproducing data that is recorded on a DVD-Audio, comprising:
    a data reproducing unit, configured to reproduce the data;
    a displaying unit; and
    a controlling unit being:
        configured to control the data reproducing unit to reproduce in seriatim respective data in one or a plurality of subgroups belonging to the group when a group of data is reproduced;
        configured to determine whether or not the subgroup is a last subgroup in the group as a first determination, after data in each subgroup belonging to the group is reproduced;
        configured to determine whether or not a menu display forced is indicated from management data of the subgroup when the subgroup is the last subgroup in the group as a second determination; and
        configured to form a menu screen and control the display unit to display the menu screen even when the menu display forced is not indicated.

3. The disk reproducing apparatus according to claim 2, wherein the controlling unit is configured to execute the first determination when the data reproducing unit reproduces a plurality of groups.

4. The disk reproducing apparatus according to claim 2, wherein, the controlling unit is configured to neither execute the second determination nor display the menu screen when a repeat play is executed in reproducing the group.

5. The disk reproducing apparatus according to claim 3, wherein, the controlling unit is configured to neither execute the second determination nor display the menu screen when a repeat play is executed in reproducing the group.

6. A disk reproducing method for reproducing data that is recorded on a DVD-Audio, comprising:
   in reproducing a group of data, reproducing in seriatim respective data in one or a plurality of subgroups belonging to the group;
   after data in each subgroup belonging to the group is reproduced, deciding whether or not the subgroup is a last subgroup in the group;
   if the subgroup is the last subgroup in the group, deciding whether or not a menu display forced is indicated from management data of the subgroup;
   if the menu display forced is indicated, forming a menu screen based on menu data in management data of the DVD-Audio, and displaying the menu screen;
   if the menu display forced is not indicated, deciding whether or not the menu data is present from the management data of the DVD-Audio, and
   if the menu data is present, forming the menu screen based on the menu data, and displaying the menu screen.

7. A disk reproducing method for reproducing data that is recorded on a DVD-Audio, comprising:
   reproducing in seriatim respective data in one or a plurality of subgroups belonging to the group when a group of data is reproduced;
   determining whether or not the subgroup is a last subgroup in the group as a first determination, after data in each subgroup belonging to the group is reproduced;
   determining whether or not a menu display formed is indicated from management data of the subgroup when the subgroup is the last subgroup in the group as a second determination; and
   forming a menu screen and displaying the menu screen even when the menu display forced is not indicated.

8. The disk reproducing method according to claim 7, wherein, when the reproducing a plurality of groups, the first determination is conducted.

9. The disk reproducing method according to claim 7, wherein when a repeat play is executed in reproducing the group, neither executing the second determination nor displaying the menu screen.

10. The disk reproducing method according to claim 8, wherein when a repeat play is executed in reproducing the group, neither executing the second determination nor displaying the menu screen.

\* \* \* \* \*